Patented Dec. 11, 1934

1,983,894

UNITED STATES PATENT OFFICE 1,983,894

SYNTHESIS OF CAMPHOR

Ernst K. H. Berger, Wilmington, Del., assignor to E. I. du Pont de Nemours & Company, Wilmington, Del., a corporation of Delaware No Drawing. Application November 25, 1930, Serial No. 498,204

12 Claims. (Cl. 260—133)

This invention relates to a process for producing camphor, synthetically, and more particularly is concerned with an improvement in processes for the manufacture of camphor from borneol. It is known that isoborneol can be oxidized into camphor in the presence of water and alkalies by means of certain oxidizing agents such as peroxide, manganese and copper oxide (see U. S. Patent No. 989,651, April 18, 1911). Moreover, it is known that hydrogen can be split off from many organic compounds by heating them to high temperatures in the presence of finely divided metals, such as finely divided copper, nickel, etc., the metals being present in small amounts and acting catalytically. This process has been applied to the catalytic dehydrogenation of borneol (see U. S. Patent No. 994,437, June 6, 1911). Since the yields are low, both of these processes are unsatisfactory for the commercial production of camphor. Moreover, in the first mentioned process, the cost of the materials required is prohibitive while, in the second process, the yields are particularly unsatisfactory due to the dehydration of the borneol rather than the dehydrogenation. The temperatures are also inconveniently high.

Accordingly, it is the object of the present invention to devise a method for the production of camphor from borneol which is at once commercially feasible and productive of high yields.

With these objects in view, I have found that camphor can be produced from borneol with high yields by dehydrogenating the borneol catalytically in the liquid phase in an alkaline reaction and in the presence of a catalyst.

By the term borneol I do not refer in general to that class of compounds which includes borneol, isoborneol, camphene hydrate and methyl camphenilol all of which are chemical isomers and many of which occur in dextro, laevo and dextro laevo forms, but I do refer specifically to the borneol which is produced in nature in many plant organisms; occurs as acetate in Siberian and Nordish pine oil; and is found in the stump rosin of various varieties of pine and hence is contained in American pine oil. It is also produced from bornyl chloride by the Grignard reaction.

In carrying out this process the borneol employed should be pure and particularly should not be contaminated with ethers or esters or with tertiary alcohols of the terpene series.

The reaction mass should contain no catalytic poison such as chlorine compounds or sulfur compounds and must be liquid at the temperature of reaction. The mass must also be alkaline. The catalyst must be in a finely divided condition. In order to make the mechanical operation simple there should be present some solvent which will boil and condense below the subliming point of borneol or camphor so as to keep the apparatus dome clear and to keep the borneol in the field of reaction. At the start solvent is also necessary to render the mass liquid at the reacting temperature. The amount of solvent present, however, should be kept at a minimum as it tends to slow up the reaction. Along with the alkaline condition the catalyst must function at temperatures below 200° C. to avoid dehydration. A slight reaction occurs at temperatures approximating 125° C. Best results are, however, obtained at the preferred temperatures indicated in the examples.

It has been found that a highly reactive catalyst suitable for use in the process may be produced in situ together with the desired alkalinity and water by means of the progressive decomposition under the influence of heat of a calcium hydroxide copper hydroxide complex, while at the same time, providing the means for boiling off the excess of water as formed. The progressive decomposition of the complex maintains the desired alkalinity, catalyst and water, which of course is drawn off substantially as fast as formed, present throughout the course of the reaction.

The following examples of specific embodiments are furnished as illustrations of a satisfactory procedure to be followed in carrying out the process. It will be understood that the invention is not limited to the specific proportions or conditions therein set forth.

Example I

The complex for furnishing the water, alkali and catalyst is first prepared. For this purpose 110 g. of hydrated lime and 5000 cc. of water are put into an agitated vessel. To this matter is added during 2 hours, while thoroughly agitated, a solution of 24 g. of copper nitrate in 300 cc. of water. The resulting mass is filtered and the precipitate washed free of calcium nitrate. It is then dried at 60° C. and gently reduced to such a size as to pass through a 30 mesh screen. Violent treatment should be avoided inasmuch as it injures the reactivity. A vessel provided with an agitator and means to maintain it at about 180° C. is then charged with 100 g. of borneol which has been previously purified and with 25 cc. of toluene and 2 cc. of high-boiling solvent naphtha (B. P. 155–170° C.). This mixture is heated to about 175° C. and the toluene allowed to distill off. By this step the last trace of free water is removed. Approximately 10 g. of the previously prepared catalyst-forming material described above is thereupon added. The mixture is continuously agitated and held at 175-185° C. while the hydrogen and the water formed escape along with a little of the solvent naphtha. The mass in the vessel is then dissolved in alcohol and filtered. The camphor may be recovered from the reaction mixture in any well known way, for example, by crystallization or by sublimation. A yield of about 90 g. is obtained.

*Example II*

On a large scale, less than half the proportionate amount of catalyst employed in Example I is necessary and the catalyst-forming material instead of being added all at once is added gradually the rate of addition being controlled by the violence of the reaction. For instance, about 3400 lbs. of borneol are charged into a 600 gal. kettle provided with an agitator and a heating device where it is mixed with about 340 lbs. of fresh commercial coal tar naphtha. When heat is applied the whole mass is dried by the simultaneous evolution of the vapors of coal tar naphtha and water. While some coal tar naphtha is still left in the mass and with the temperature at about 175° C., about 2 lbs. of the catalyst-forming material is added and then successively 1 lb. at a time is added as the violence of the reaction permits, while the temperature is maintained at between about 175 and 180° C. When about 120 lbs. of the catalyst-forming material have been added, during a period of about 50 hours, the reaction is complete. It is important that there be some coal tar naphtha remaining to the end of the reaction. The camphor may be recovered from the reaction mixture in any well known way, for example, by crystallization or by sublimation.

It will be obvious to any chemist skilled in the art that other catalyst-forming materials may be employed than that specifically disclosed hereinabove. The essential condition for such materials is that they be capable when added to the reaction mixture of furnishing in situ the alkali and water in addition to a dehydrogenating catalyst. Obviously, other solvents than naphtha may be employed and the temperature may be varied, although as already stated the temperatures disclosed in the examples represent the preferred range. Obviously, also if desired the catalyst, alkali and water can be added separately, it being understood that under these circumstances the water would be removed practically as fast as added.

As many apparent and widely different embodiments of this invention may be made without departing from the spirit thereof, it is to be understood that I do not limit myself to the foregoing examples or description except as indicated in the following claims.

I claim:

1. The process of producing camphor which comprises heating borneol to a temperature between 125° and 200° C. in the presence of a solvent adapted to condense at a temperature below the subliming point of borneol and less than about 10%, based on the weight of borneol, of a calcium hydroxide-copper hydroxide complex adapted under the conditions of the reaction to form a dehydrogenating catalyst, water and alkali.

2. The process of producing camphor which comprises heating borneol to a temperature between 125° and 200° C. in the presence of a solvent boiling at a temperature below the subliming point of borneol and less than about 10%, based on the weight of borneol, of a calcium hydroxide-copper hydroxide complex prepared by reacting calcium hydroxide with copper nitrate.

3. The process of producing camphor which comprises heating borneol to a temperature between 125° and 200° C. in the presence of naphtha and less than about 10%, based on the weight of borneol, of a calcium hydroxide-copper hydroxide complex prepared by reacting about 110 parts by weight of calcium hydroxide with 24 parts by weight of copper nitrate in water solution and filtering to obtain the precipitate.

4. The process of producing camphor from borneol which comprises mixing about 340 parts by weight of borneol with 34 parts of naphtha, heating to about 175° C., adding in successive stages, while maintaining the temperature between 175° and 180° C., about $\frac{1}{10}$ part of a calcium hydroxide-copper hydroxide complex (adapted upon heating to yield alkali, water and a dehydrogenating catalyst) until about 12 parts have been added and thereafter removing the camphor.

5. The process of producing camphor which comprises heating borneol to a temperature between 125° C. and 200° C. in the presence of less than about 10%, based on the weight of borneol, of a calcium hydroxide-copper hydroxide catalyst.

6. In a process of producing camphor which comprises heating borneol to a temperature between 125° C. and 200° C. in the presence of a solvent adapted to condense at a temperature below the subliming point of borneol under the conditions of reaction and in the presence of a calcium hydroxide-copper hydroxide catalyst, the step which comprises adding to the reaction zone during the course of the reaction a calcium hydroxide-copper hydroxide catalyst in such proportions that the total amount of catalyst does not exceed about 10% by weight of borneol present in the reaction zone.

7. The process of producing camphor which comprises heating borneol to a temperature between about 175° C. and about 185° C. in the presence of naphtha and less than about 10%, based on the weight of borneol, of a calcium hydroxide-copper hydroxide catalyst.

8. The process of producing camphor which comprises heating borneol to a temperature between 125° C. and 200° C. in the presence of a solvent adapted to condense at a temperature below the subliming point of borneol and less than about 10%, based on the weight of borneol, of a calcium hydroxide-copper hydroxide complex prepared by agitating calcium hydroxide and copper nitrate in water solution, isolating the solid product and gently reducing it to relatively small size particles.

9. The process of producing camphor which comprises subjecting borneol to dehydrogenation in the presence of water, the amount of water being not substantially greater than that formed when the same amount of borneol is heated at a temperature of about 175° C. in the presence of about 10%, based on the weight of borneol, of a calcium hydroxide-copper hydroxide catalyst prepared by reacting about 110 parts by weight of calcium hydoxide with about 24 parts by weight of copper nitrate in water solution, filtering and drying the residue at about 60° C.

10. The process of producing camphor which comprises subjecting borneol to dehydrogenation by heating in the presence of alkali, a dehydrogenation catalyst and water, the amount of water being not substantially greater than that formed when the same amount of borneol is heated to a temperature of about 175° C. in the presence of about 10%, based on the weight of borneol, of a calcium hydroxide-copper hydroxide catalyst prepared by reacting about 110 parts by weight of calcium hydroxide with about 24 parts by weight of copper nitrate in water solution, filtering and drying the residue at about 60° C.

11. The process of claim 10, in which a solvent is present during the dehydrogenation.

12. The process of claim 10, in which the water is formed in situ in the reaction mixture and is removed as the reaction proceeds.

ERNST K. H. BERGER.